United States Patent
Jawaharlal et al.

(10) Patent No.: US 9,882,849 B2
(45) Date of Patent: Jan. 30, 2018

(54) ACTION ASSIGNMENT AND TRACKING FUNCTIONALITY FOR EMAIL

(71) Applicant: International Business Machines Corporation, Armonk, NY (US)

(72) Inventors: Samuel Mathew Jawaharlal, Chennai (IN); Bala Priyadarshini Muralidharan, Bangalore (IN); Arunachalam Narayanan, Chennai (IN); Sathya Santhar, Chennai (IN); Balamurugaramanathan Sivaramalingam, Ramanathapuram (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/659,900

(22) Filed: Mar. 17, 2015

(65) Prior Publication Data

US 2016/0277330 A1    Sep. 22, 2016

(51) Int. Cl.
*H04L 12/58* (2006.01)

(52) U.S. Cl.
CPC ............. *H04L 51/08* (2013.01); *H04L 51/18* (2013.01); *H04L 51/34* (2013.01); *H04L 51/02* (2013.01)

(58) Field of Classification Search
CPC ......... H04L 51/02; H04L 51/08; H04L 51/18; H04L 51/34
See application file for complete search history.

(56) References Cited

U.S. PATENT DOCUMENTS

| 7,010,616 | B2 | 3/2006 | Carlson et al. |
| 7,064,681 | B2 | 6/2006 | Horstemeyer |
| 7,113,110 | B2 | 9/2006 | Horstemeyer |
| 7,119,716 | B2 | 10/2006 | Horstemeyer |
| 7,213,210 | B2 | 5/2007 | Reysa |
| 7,305,441 | B2 | 12/2007 | Mathewson, II et al. |
| 8,117,263 | B2 | 2/2012 | Malik |
| 8,380,802 | B1 | 2/2013 | King et al. |
| 8,719,348 | B2 | 5/2014 | Bishop |

(Continued)

OTHER PUBLICATIONS

"Auto Follow-up Email Function", IP.com Prior Art Database, Publication Date: Mar. 9, 2006, <http://ip.com/IPCOM/000134545>.

(Continued)

*Primary Examiner* — Nicholas Taylor
*Assistant Examiner* — Afroza Sultana
(74) *Attorney, Agent, or Firm* — Maeve Carpenter (57) ABSTRACT

In an approach to action assignment and tracking, a computer receives a first email from a first computing device, where the first email includes at least one action assigned by a sender of the first email to at least one recipient of the first email. The computer determines whether the sender specified a due date for the action. The computer determines whether the sender specified one or more time intervals for a status update of the action. In response to determining the sender specified at least one of a due date for the action and one or more time intervals for a status update of the action, the computer initiates a timer. In response to determining the sender specified one or more time intervals for a status update of the action, the computer provides a status of the action to the sender at the one or more time intervals.

18 Claims, 6 Drawing Sheets

(56) References Cited

U.S. PATENT DOCUMENTS

| | | | | |
|---|---|---|---|---|
| 2002/0169841 | A1* | 11/2002 | Carlson | G06Q 10/107 709/206 |
| 2004/0210587 | A1* | 10/2004 | Reysa | G06Q 10/107 |
| 2006/0259556 | A1 | 11/2006 | Auhagen | |
| 2007/0168430 | A1 | 7/2007 | Brun et al. | |
| 2008/0205610 | A1* | 8/2008 | Bishop | H04L 51/24 379/93.24 |
| 2008/0320417 | A1 | 12/2008 | Begley et al. | |
| 2009/0055498 | A1 | 2/2009 | Brown | |
| 2010/0287249 | A1* | 11/2010 | Yigang | G06Q 10/107 709/206 |
| 2011/0087744 | A1* | 4/2011 | Deluca | G06Q 10/107 709/206 |
| 2012/0179765 | A1 | 7/2012 | White et al. | |
| 2013/0151628 | A1 | 6/2013 | Catalano et al. | |
| 2014/0052797 | A1* | 2/2014 | Lessard | H04L 51/18 709/206 |

OTHER PUBLICATIONS

"Create polls in email messages and review the results", Office Online, © 2014 Microsoft, <https://support.office.com/en-in/article/Create-polls-in-email-messages-and-review-the-results-8091ce3b-dd08-4008-b15b-98030fff2fcf? CorrelationId=edf30ce4-9446-41d5-a721-4d175cdb4bb4&ui=en-US&rs=en-IN&ad=IN>.

"Create tasks and to-do items", Office Online, © 2014 Microsoft, <https://support.office.com/en-in/article/Create-tasks-and-to-do-items-45a94e7b-a4ee-46ea-9823-c3423c0eab8e?CorrelationId=f03ea66e-e8a9-46ee-b580-1acba3c3060a&ui=en-US&rs=en-IN&ad=IN>.

"Creating Email Alerts for Workflow, Approvals, or Milestones", Salesforce Success Comminity, © 2000-2015, salesforce.com, inc, <https://help.salesforce.com/HTViewHelpDoc?id=creating_workflow_alerts.htm&language=en_US>.

"Get Free SMS Alerts for New and Important Emails on Gmail with Google Docs", Tech Awakening, updated Mar. 3, 2014, <http://techawakening.org/free-sms-alerts-new-email-on-gmail-with-google-docs/1130/>.

IBM, "Email Dashboarding Mechanism", IP.com Prior Art Database, Dec. 29, 2009, <http://ip.com/IPCOM/000191311>.

IBM, "Identifying actions requiring follow up from email received during absence", IP.com Prior Art Database, Publication Date: Apr. 17, 2014, http://ip.com/IPCOM/000236282>.

IBM, "Reminder System", IP.com Prior Art Database, Publication Date: Oct. 19, 2005, <http://ip.com/IPCOM/000130323>.

* cited by examiner

┌─────────────────────────────────────────────────────────┐
│ ACTION 1              212                           214 │
│ ASSIGNED TO     ┌─────────────────────────┐        ┌───┐│
│                 │ ENTER NAME(S)           │        │ALL││
│                 └─────────────────────────┘        └───┘│
│ DUE DATE        ┌──────────────┐                        │
│                 │ ENTER DATE   │ ─216                   │
│                 └──────────────┘                        │
│ STATUS INTERVAL(S) ┌────────────────────┐               │
│                    │ ENTER TIME INTERVAL(S)│─218        │
│                    └────────────────────┘               │
│                   220       222       224               │
│ EMAIL BASED ACTION ┌────┐ ┌───────┐ ┌────────┐          │
│                    │OPEN│ │RESPOND│ │FORWARD │          │
│                    └────┘ └───────┘ └────────┘          │
│                                                         │
│ NON-EMAIL BASED ACTION                                  │
│ ACTION         ┌──────────────────────────────┐         │
│                │ ENTER ACTION                 │─226     │
│                └──────────────────────────────┘         │
│   ┌──────────────────┐      ┌──────────────┐            │
│   │ADDITIONAL ACTIONS?│─228 │SAVE AND CLOSE│─230        │
│   └──────────────────┘      └──────────────┘            │
└─────────────────────────────────────────────────────────┘

ACTION ASSIGNMENT AND TRACKING FUNCTIONALITY FOR EMAIL

BACKGROUND OF THE INVENTION

The present invention relates generally to the field of electronic mail systems, and more particularly to action assignment and tracking functionality for electronic mail systems.

Electronic mail, or email, systems provide a means for individuals to communicate quickly and efficiently, both in business settings and for personal use, regardless of geographic location. Individuals use email messages to keep in touch with and communicate with other users. Additionally, email messages provide a medium to collaborate and exchange documents. Email systems typically include limited functionality from a sender's point of view with regards to the status of a sent email. A sender can mark an email for "return receipt" which notifies the sender that a recipient has opened the email. In addition, a sender can flag an email as "urgent" when the sender needs a timely response from the recipient. If a recipient has enabled an "out of office" feature, a sender is notified that a recipient did not receive the sent email, informing the sender that an urgent message will not likely be acted upon with urgency.

SUMMARY

Embodiments of the present invention disclose a method, a computer program product, and a system for action assignment and tracking. The method may include one or more computer processors receiving a first email from a first computing device, where the first email includes at least one action assigned by a sender of the first email to at least one recipient of the first email. The one or more computer processors determine whether the sender specified a due date for the action. The one or more computer processors determine whether the sender specified one or more time intervals for a status update of the action. Responsive to determining the sender specified at least one of a due date for the action and one or more time intervals for a status update of the action, the one or more computer processors initiate a timer. Responsive to determining the sender specified one or more time intervals for a status update of the action, the one or more computer processors provide a status of the action to the sender at the one or more time intervals.

DETAILED DESCRIPTION

In existing messaging systems, such as email, a message sender has relatively little control over how a message recipient handles the received message. For example, the message sender cannot control when a recipient opens or views a particular message, how a recipient prioritizes messages, whether a recipient addresses messages that require some type of follow up action, etc. There are scenarios when a recipient may not see a message in time, for example if the recipient is busy when the message arrives, or if the recipient has configured an email client to check for new messages with relative infrequency. In addition, an email message may notify the recipient that an action has to be completed by a relatively long lead time. The message may subsequently become "lost" in the recipient's inbox as time passes, resulting in the recipient forgetting about the required action. Also, if a sender is assigning different actions to multiple email recipients on varying timelines, the sender may assign the actions on the recipient level by sending an email to each recipient, rather than collating the actions within one email. Subsequently, in order to track the status of the assigned actions, the sender often sends multiple follow up emails to the various recipients.

Embodiments of the present invention recognize that efficiency can be gained by incorporating an action assignment and status tracker into an email system for email senders. Implementation of embodiments of the invention may take a variety of forms, and exemplary implementation details are discussed subsequently with reference to the Figures.

Figure 1:
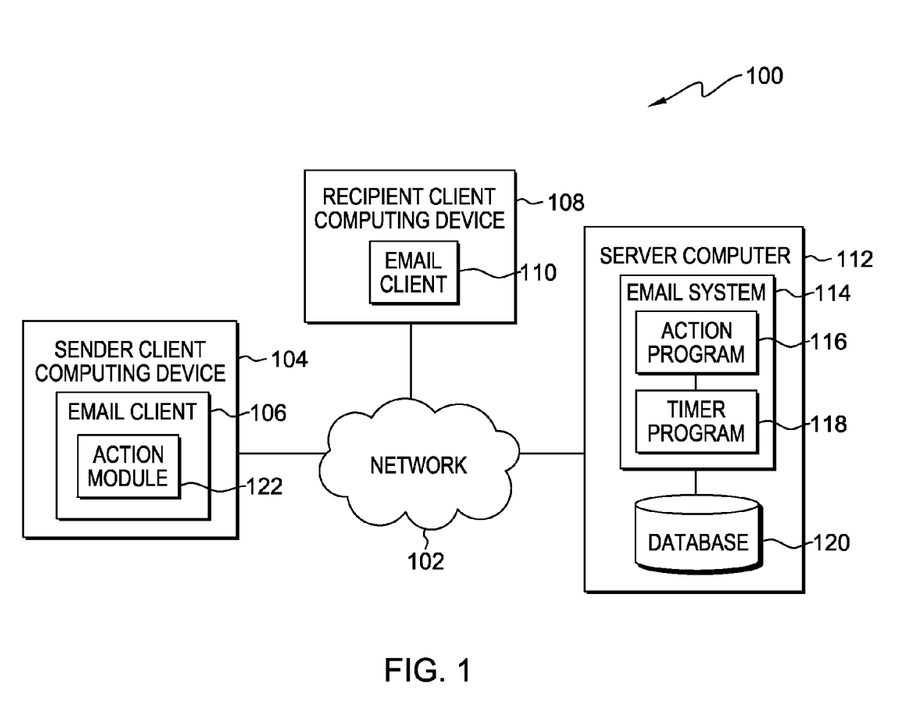
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes sender client computing device 104, recipient client computing device 108, and server computer 112, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between sender client computing device 104, recipient client computing device 108, server computer 112, and other computing devices (not shown) within distributed data processing environment 100.

Sender client computing device 104 and recipient client computing device 108 can each be a desktop computer, a laptop computer, a tablet computer, a specialized computer server, a smart phone, or any programmable electronic device capable of communicating with various components and devices within distributed data processing environment 100, via network 102. In general, sender client computing device 104 and recipient client computing device 108 each represents any programmable electronic device or combination of programmable electronic devices capable of executing machine readable program instructions and communicating with other computing devices (not shown) within distributed data processing environment 100 via a network, such as network 102. Sender client computing device 104 includes email client 106. Recipient client computing device 108 includes email client 110.

Email client 106 and email client 110 are each one of a plurality of computer programs used to access and manage a user's email, as are known in the art. Email client 106 acts as a user interface between sender client computing device 104 and server computer 112. Email client 110 acts as a user interface between recipient client computing device 108 and server computer 112. When a sender generates a new email, email client 106 presents the sender with an input space that includes one or more known functions, for example, send, save, forward, and reply. Email client 106 includes action module 122. Action module 122 includes a function capable of enabling the sender to assign actions to one or more recipients within an email. Action module 122 also includes a function capable of enabling the sender to choose to notify one or more recipients of an email via a short message service (SMS) message. Action module 122 may also flag an email to indicate an assigned action is included in the email. For example, action module 122 may insert data into the header text or metadata of an email with an indication of one or more actions. Action module 122 is depicted and described in further detail with respect to FIG. 2A and FIG. 2B.

Server computer 112 can be a standalone computing device, a management server, a web server, a mobile computing device, or any other electronic device or computing system capable of receiving, sending, and processing data. In other embodiments, server computer 112 can represent a server computing system utilizing multiple computers as a server system, such as in a cloud computing environment. In another embodiment, server computer 112 can be a laptop computer, a tablet computer, a netbook computer, a personal computer (PC), a desktop computer, a personal digital assistant (PDA), a smart phone, or any programmable electronic device capable of communicating with sender client computing device 104, recipient client computing device 108, and other computing devices (not shown) within distributed data processing environment 100 via network 102. In another embodiment, server computer 112 represents a computing system utilizing clustered computers and components (e.g., database server computers, application server computers, etc.) that act as a single pool of seamless resources when accessed within distributed data processing environment 100. Server computer 112 includes email system 114 and database 120.

Email system 114 is one of a plurality of computer programs known in the art for transmitting electronic mail messages from one computer to another. Email system 114 may be built around agreed-upon, standardized protocols for handling mail messages and any data files (such as images, multimedia, or documents) that can be attached to the messages. Email system 114 includes action program 116 and timer program 118.

Action program 116 determines if an outgoing email includes an assigned action. If the email does include an assigned action, and the assigned action has a due date and/or a specified time interval for action status, then action program 116 initiates timer program 118. In one embodiment, action program 116 resides on server computer 112. In another embodiment, action program 116 may reside on sender client computing device 104. Action program 116 is depicted and described in further detail with respect to FIG. 3.

Timer program 118 tracks the status of actions assigned to one or more recipients such that the program can present a consolidated view to a sender when requested. Timer program 118 initiates a timer for one or more actions assigned by a sender in an email. If the sender requests status updates, then timer program 118 provides action status to the sender at defined time intervals. If a recipient does not complete an action by the due date, timer program 118 notifies the recipient that the action is not complete. When a recipient completes an assigned action, timer program 118 notifies the sender. Timer program 118 also determines whether a recipient that is unavailable will become available in time to perform an assigned action, and if not, then the program notifies the recipient via an additional notification tool that an urgent email was sent to the recipient. Timer program 118 is depicted and described in further detail with respect to FIG. 4.

Database 120 resides on server computer 112. In another embodiment, database 120 can reside on sender client computing device 104, recipient client computing device 108, or elsewhere in the environment. A database is an organized collection of data. Database 120 can be implemented with any type of storage device capable of storing data and configuration files that can be accessed and utilized by server computer 112, such as a database server, a hard disk drive, or a flash memory. In other embodiments, database 120 can represent multiple storage devices within server computer 112. Database 120 stores action assignments and associated due dates and status intervals. Database 120 may also store recipients' names, email addresses, and other identification, as well as additional addresses that can be used with SMS messages.

Figure 2A:
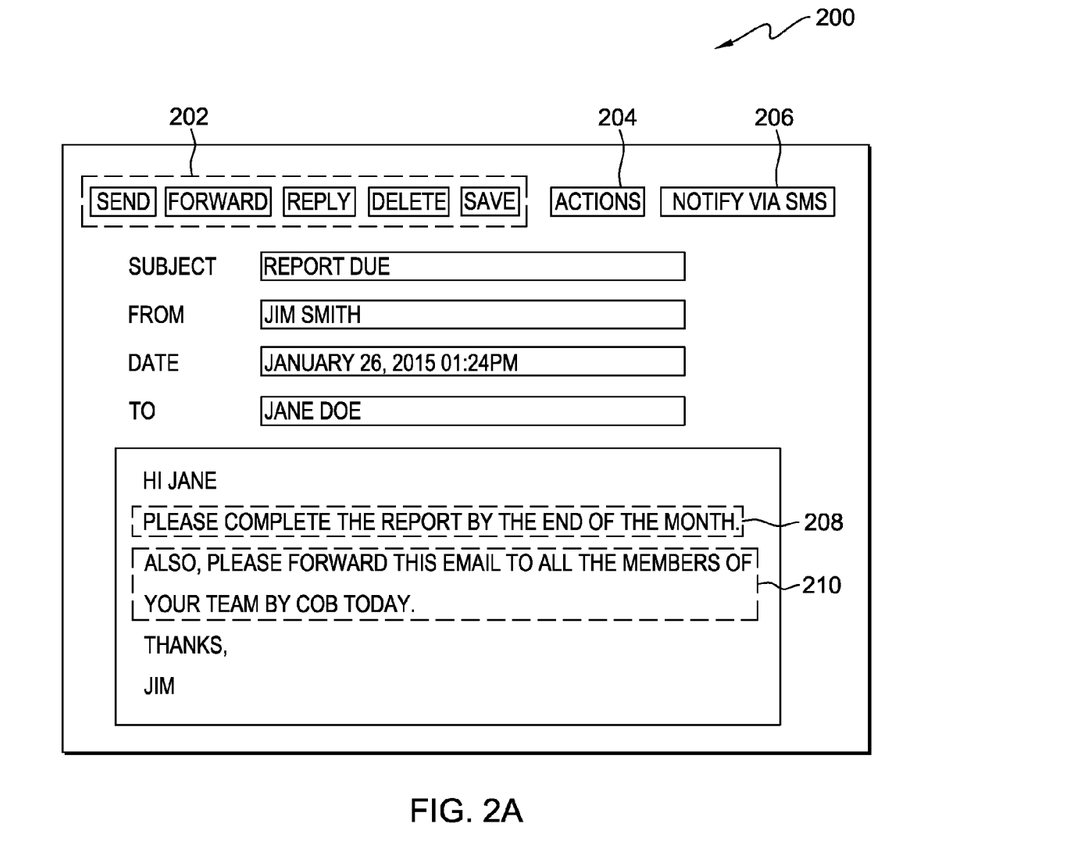
FIG. 2A depicts an email format that includes buttons that interface to an action program on a server computer within the distributed data processing environment of FIG. 1, in accordance with an embodiment of the present invention.

FIG. 2A depicts email format 200 that includes actions button 204 and notify via SMS button 206 that interface to action program 116 on server computer 112 within distributed data processing environment 100 of FIG. 1, in accordance with an embodiment of the present invention.

When a sender initiates an email, email client 106 provides email format 200. Email format 200 includes buttons 202 which initiate common actions for emails, as known in the art, for example, send, forward, reply, delete, and save. Email format 200 also includes common input fields for the subject of the email, the sender's name, email address, or other identification, the time and date of the email, the recipient's name, email address, or other identification, as well as a field for the message. In addition, email format 200 includes actions button 204. Actions button 204 interfaces with action program 116 on server computer 112, via action module 122. When a sender clicks on actions button 204, an action screen, such as a dropdown box, appears that enables the sender to assign actions to one or more email recipients. In the example message depicted in email format 200, the sender mentions two actions for a recipient to complete. Action 208, completing a report, is an action for the recipient to complete outside of email system 114. Action 208 can be referred to as a non-email based action. Action 210, forwarding an email, is an action for the recipient to complete within email system 114, via email client 110. Action 210 can be referred to as an email based action. Once the sender assigns the actions and sends the email, action program 116 initiates. In another embodiment, instead of clicking actions button 204, the sender can select a recipient's name or email address in the "To" field and right-click to bring up a dropdown box. A sender can assign multiple actions to one recipient. A sender can assign actions to all recipients or to a subset of recipients.

In the depicted embodiment, email format 200 also includes notify via SMS button 206. SMS is a text messaging service component of phone, Web, or mobile communication systems. SMS uses standardized communications protocols to allow fixed line or mobile phone devices to exchange short text messages. In some embodiments, SMS notification includes the use of electronic pagers. Notify via SMS button 206 interfaces with timer program 118 on server computer 112, via action module 122. When a sender clicks on notify via SMS button 206, an action screen appears that enables the sender to choose one or more email recipients for notification via SMS. In another embodiment, a sender can choose to notify one or more recipients via SMS by right-clicking on a recipient's name, email address, or other identification within the email and choosing "notify via SMS" from an action screen. A sender may choose to notify an email recipient via SMS if the email is urgent and the sender wants to ensure the recipient is aware that the email is in the recipient's inbox.

In one embodiment, actions button 204 and notify via SMS button 206 are buttons the sender clicks on. In another embodiment, actions button 204 and notify via SMS button 206 may be a list of selections or options from which a sender can choose, via, for example, a checkbox. In a further embodiment, actions button 204 and notify via SMS button 206 may be included in a dropdown box.

Figure 2B:
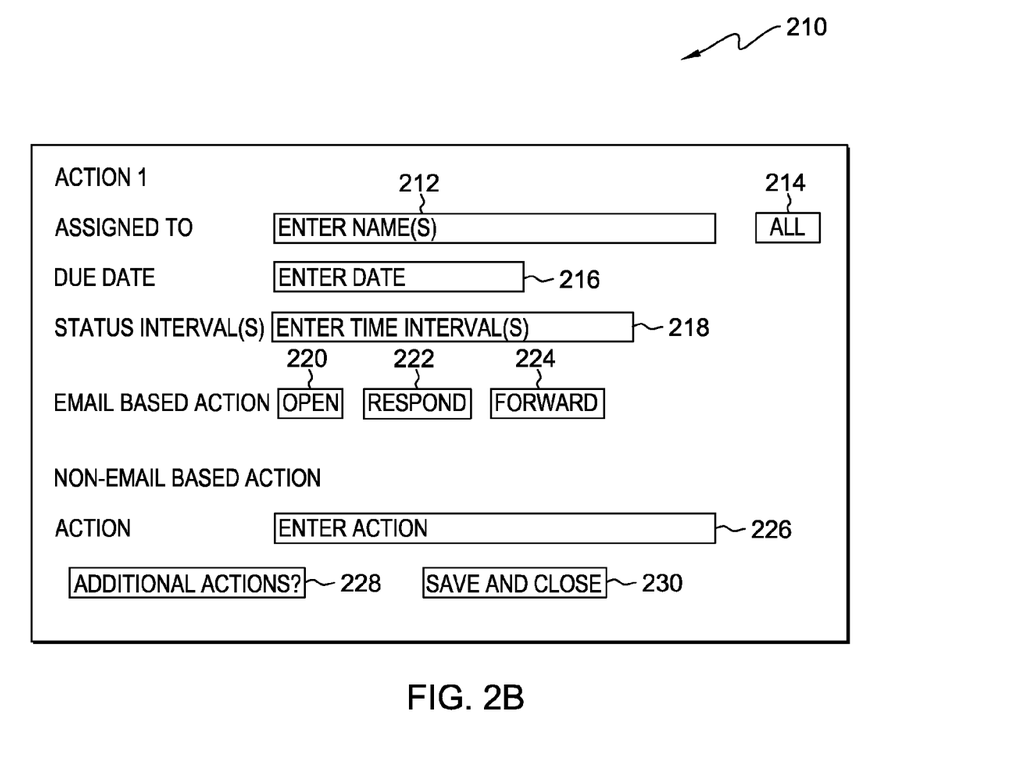
FIG. 2B depicts an action screen of the email format on a client computing device within the distributed data processing environment of FIG. 1, for assigning actions, in accordance with an embodiment of the present invention.

FIG. 2B depicts action screen 210 of email format 200 on sender client computing device 104 within distributed data processing environment 100 of FIG. 1, for assigning actions, in accordance with an embodiment of the present invention.

Action screen 210 includes a plurality of input fields enabling a sender to assign one or more actions. Actions can be assigned to one or more recipients, and one or more actions can be assigned to each recipient. Assignment input field 212 allows a sender to input the name of one or more recipients of the email to whom the action is assigned. A recipient's name may include the recipient's email address or other identification, such as an employee ID. Assignment input button 214 allows the sender to select all of the email recipients with one click. If the sender chooses to assign a due date, the sender enters the due date of the action in due date input field 216. If the sender chooses to not assign a due date, then the sender can leave due date input field 216 blank. If the sender wants timer program 118 to provide the sender with status of the action, then the sender enters a time interval in status interval input field 218. For example, if the sender wants to receive a status daily, then the sender enters "1 day" into status interval input field 218. In another example, if the sender only wants a status update after 80% of the time allotted for the action has passed, then the sender may enter "80%" into status interval input field 218. If the sender chooses to not receive status updates, then the sender can leave status interval input field 218 blank. If the action the sender is assigning is an email based action, then the sender can click on a button that represents performing an email based action. Email based actions are depicted as, but not limited to, open button 220, respond button 222, and forward button 224. For example, if the sender is requesting action 210, as described with respect to FIG. 2A, then the sender clicks forward button 224 which initiates action program 116 and timer program 118 once the sender sends the email. If the action the sender is assigning is a non-email based action, then the sender enters a description of the action in action input field 226.

In one embodiment, to assign additional actions associated with the same email, the sender clicks on additional actions button 228. Clicking on additional actions button 228 opens a duplicate of action screen 210 with which the sender can assign an additional action. The sender can continue clicking on additional actions button 228 until the sender finishes assigning actions. In another embodiment, the sender can assign multiple actions by inputting all of the actions to a single screen in action screen 210. In one embodiment, there may also be a button labeled "notify via SMS" (not shown), such that the sender can choose to notify the recipient of the email and/or assigned action via an SMS message in addition to the email. In another embodiment, the sender may choose to notify the recipient of the email and/or assigned action via an SMS message by right-clicking on the recipient's name in assignment input field 212 where a dropdown box can appear with a choice of "notify via SMS." When the sender finishes assigning actions, the sender clicks on save and close button 230 and returns to the email message, i.e. email format 200. When the one or more actions are saved, the inputs are stored in database 120. FIG. 2B depicts one embodiment of action screen 210. In various embodiments, the system administrator may configure a plurality of layouts and combinations of options and fields. For example, one configuration of action screen 210 may include only a due date and may not have an option of selecting status intervals.

Figure 3:
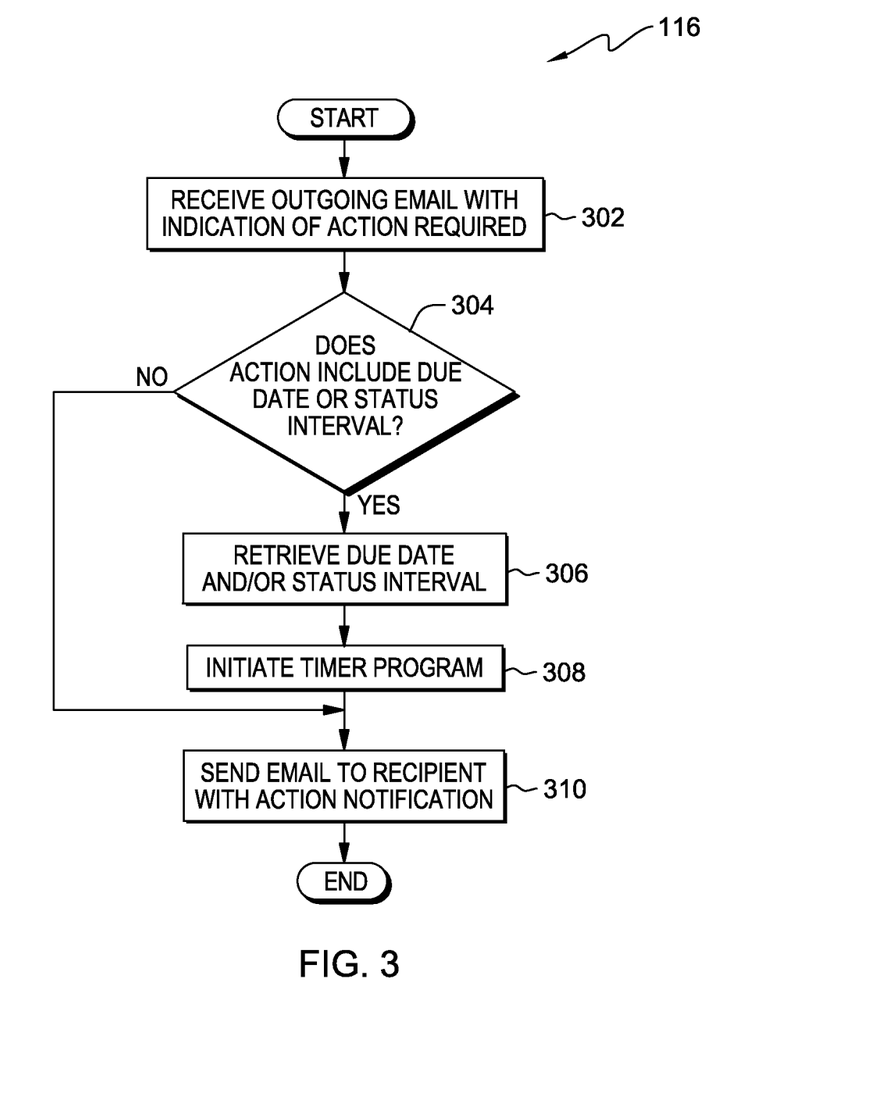
FIG. 3 is a flowchart depicting operational steps of the action program, on a server computer within the distributed data processing environment of FIG. 1, for determining whether an assigned action requires tracking, in accordance with an embodiment of the present invention.

FIG. 3 is a flowchart depicting operational steps of action program 116, on server computer 112 within distributed data processing environment 100 of FIG. 1, for determining whether an assigned action requires tracking, in accordance with an embodiment of the present invention.

Action program 116 receives an outgoing email with an indication of at least one action required (step 302). If an email sender assigns one or more actions within an email, action module 122 flags the email such that action program 116 intercepts the email from email client 106 prior to delivery to the one or more recipients.

Action program 116 determines whether the one or more actions assigned in the email include a due date and/or a status interval (decision block 304). Action program 116 analyzes the email to determine whether the sender included a due date and/or a status interval for any of the actions assigned in the email. For example, action program 116 looks for the presence of input in a due date input field, such as due date input field 216 as described with respect to FIG. 2B. In another example, action program 116 looks for the presence of input in a status interval input field, such as status interval input field 218 as described with respect to FIG. 2B. A sender can choose to specify one or more status intervals while not specifying a specific due date. If action program 116 determines that the one or more assigned actions do not include a due date and/or a status interval ("no" branch, decision block 304), then the program sends the email to the recipient with action notification (step 310).

If action program 116 determines that at least one of the one or more assigned actions includes a due date and/or a status interval ("yes" branch, decision block 304), then the program retrieves the due date and/or status interval for each action (step 306). Action program 116 analyzes the sender's input provided in action module 122, as described with respect to FIG. 2B, and retrieves, from database 120, the due date and/or status interval associated with an action. In one embodiment, a due date includes a time of day. For example, if an action is due by close of business (COB) on Monday, Feb. 2, 2015, then the due date can be Feb. 2, 2015 at 6:00 PM.

Action program 116 initiates timer program 118 (step 308). When action program 116 retrieves a due date and/or a status interval, the program initiates timer program 118 by providing the one or more actions and the associated due dates and/or status intervals to timer program 118.

Action program 116 sends the email to the recipient with action notification (step 310). Responsive to initiating timer program 118, or if action program 116 determines the action does not include a due date ("no" branch, decision block 304), then the program sends the email to the recipient and notifies the recipient that the email includes an assigned action. If the sender assigns different actions to multiple recipients, then action program 116 notifies each recipient to which an action is assigned. If the sender assigns more than one action to a recipient, then action program 116 notifies the recipient of all assigned actions. In one embodiment, action program 116 notifies the recipient of the action by displaying an alert, for example, a pop-up box, via email client 110, which alerts the recipient to the email. In another embodiment, action program 116 notifies the recipient of the action by changing the appearance of the email in the recipient's inbox. For example, action program 116 may display the subject of the email in a different color or style of font than other emails. In another example, action program 116 may display an action icon, such as an "A" in a margin next to the subject of the email. In a further example, action program 116 may create a separate category in the recipient's inbox for incoming emails with associated actions. In an embodiment where the sender has opted to notify the recipient via an SMS message, action program 116 sends an SMS message to the recipient via, for example, the recipient's mobile phone or pager to notify the recipient of the email that contains an assigned action. In a further embodiment, action program 116 may combine multiple methods of notifying the recipient.

Figure 4:
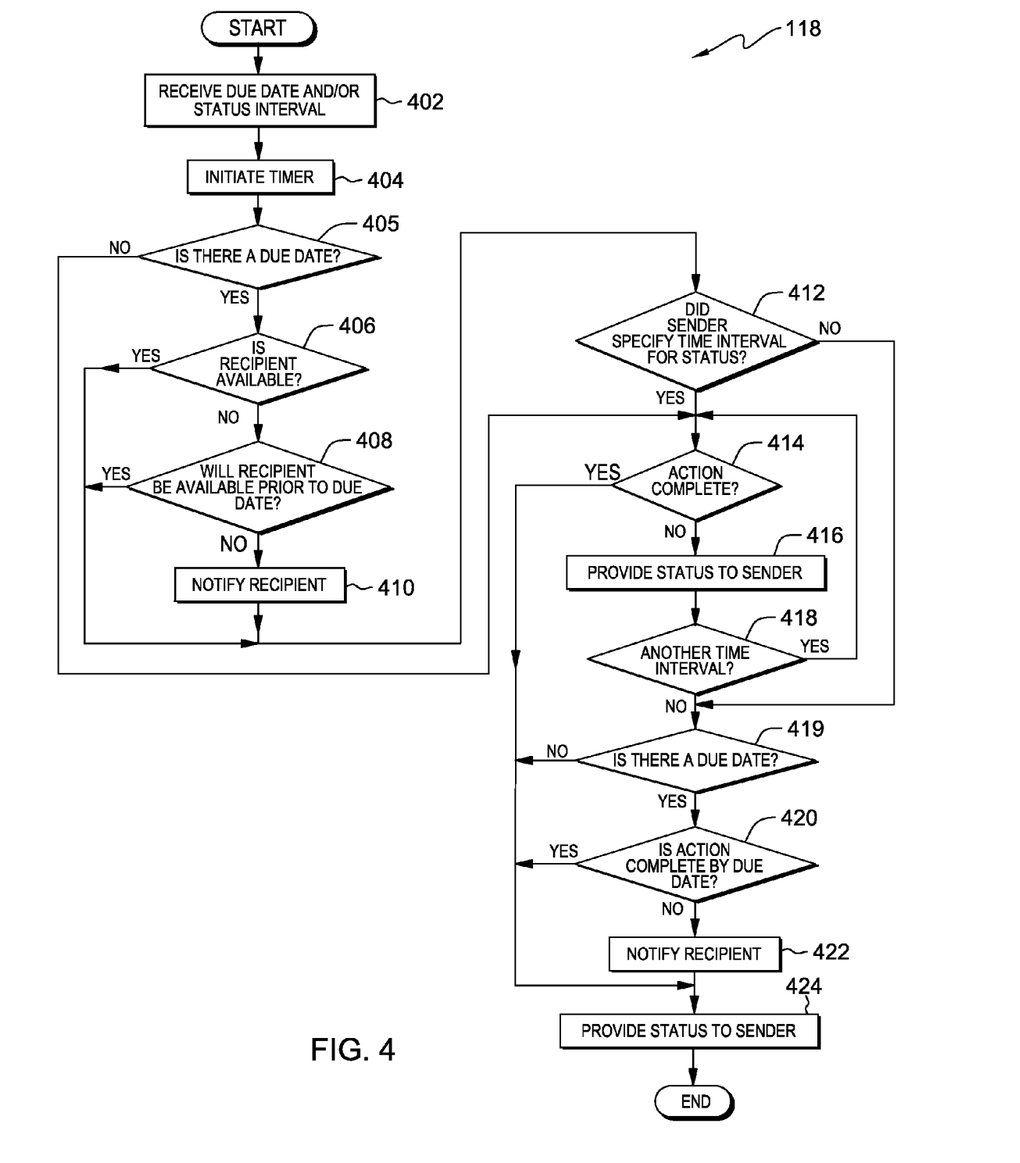
FIG. 4 is a flowchart depicting operational steps of a timer program, on a server computer within the distributed data processing environment of FIG. 1, for tracking assigned action status and providing status to a sender, in accordance with an embodiment of the present invention.

FIG. 4 is a flowchart depicting operational steps of timer program 118, on server computer 112 within distributed data processing environment 100 of FIG. 1, for tracking assigned action status and providing status to a sender, in accordance with an embodiment of the present invention.

Timer program 118 receives a due date and/or status interval (step 402). When action program 116 initiates timer program 118, timer program 118 receives a due date and/or status interval associated with an action in the email received by action program 116.

Timer program 118 initiates a timer (step 404). In order for timer program 118 to monitor the progress of an assigned action toward a due date or a status interval, the program initiates a timer. If a specified due date is a time of day or number of hours, a timer computes the time between when the sender sent the email and the time the action is due. For example, if a sender specifies a due date is "within the next six hours," then the timer can compute the time the action is due. The timer runs until the action is complete or until the due date passes, whichever comes first. In one embodiment, the timer is a countdown clock that measures time remaining until the due date. In another embodiment, the timer may be associated with a calendar or a clock, and set to go off when the date or time is reached.

Timer program 118 determines whether there is a due date (decision block 405). A sender can choose to specify one or more status intervals while not specifying a specific due date. If timer program 118 determines there is a due date ("yes" branch, decision block 405), then the program determines whether the recipient is available (decision block 406). In one embodiment, timer program 118 determines whether the recipient set an "out of office" notification, as is known in the art, via email client 110, which automatically replies to received emails with a message indicating the duration of the recipient's absence, as well as other information, such as the name of a person that is covering for the recipient. In another embodiment, timer program 118 may check the recipient's calendar to determine whether the recipient has scheduled time out of the office, is attending a meeting, etc. If timer program 118 determines that the recipient is not available ("no" branch, decision block 406), then the program determines whether the recipient will be available prior to the due date (decision block 408). In one embodiment, timer program 118 compares the due date with the date the recipient has indicated for return via the out of office notification and determines whether the recipient will return to the office prior to the action due date. In an embodiment where the sender can associate an amount of time required to complete the action when the sender assigns the action, timer program 118 can determine whether the recipient will return in time to complete the action.

If timer program 118 determines the recipient will not return prior to the due date ("no" branch, decision block 408), then the program notifies the recipient (step 410). In an embodiment where the sender has opted to notify the recipient via an SMS message, timer program 118 sends an SMS message to the recipient to alert the recipient that an action requires the recipient's attention. For example, timer program 118 may send a text message to the recipient's mobile phone. In an embodiment where the sender has not opted to notify the recipient via an SMS message, timer program 118 can notify the sender that additional action is needed to notify the recipient. For example, timer program 118 can present a popup box to the sender, via action module 122, that states, "The recipient will not return before the due date—notify via SMS?" and provide "yes" and "no" checkboxes from which the sender can choose.

Responsive to notifying the recipient, or if timer program 118 determines the recipient is available ("yes" branch, decision block 406), or if timer program 118 determines the recipient will return prior to the due date ("yes" branch, decision block 408), then the program determines whether the sender specified a time interval for status (decision block 412). Timer program 118 analyzes the sender's input to the email provided in action module 122, and determines whether the sender entered a time interval to receive status updates. For example, timer program 118 looks for the presence of input in a status interval input field, such as status interval input field 218 as described with respect to FIG. 2B.

If timer program 118 determines that the sender specified a time interval for status ("yes" branch, decision block 412), or if timer program 118 determines there is no due date ("no" branch, decision block 405), then the program determines whether the action is complete (decision block 414). If the assigned action is an email based action, such as open, forward, or reply to the email, and the recipient completes the action via actions within email client 110, then timer program 118 determines the action is complete via known procedures within email system 114. For example, if the assigned action is to forward the email, once the recipient has forwarded the email, timer program 118 determines that the forward is complete. In one embodiment, if the assigned action is a non-email based action, then timer program 118 provides an "action complete" button in the received email in email client 110 for the recipient to click once the action is complete. In another embodiment, if the recipient indicates an action is complete by replying to the sender's email with text in the message that indicates the recipient completed the action, then timer program 118 may use one of a plurality of natural language processing (NLP) techniques known in the art to interpret the message and determine the action is complete. If timer program 118 determines the action is complete ("yes" branch, decision block 414), then the program provides status to the sender (step 424).

If timer program 118 determines the action is not complete ("no" branch, decision block 414), then the program provides status to the sender (step 416). In one embodiment, timer program 118 provides status to the sender by providing a dashboard format that collates and displays the status of each of the one or more actions assigned in a particular email in a single view. For example, a sender may right-click on the sent email any time after sending the email and select "Display Status" from a dropdown box, which launches the dashboard view. In another embodiment, timer program 118 may display a popup box to the sender that indicates the status of one or more actions. For example, timer program 118 may display a popup box each time a recipient completes an action. In another example, timer program 118 may display a popup box as each specified time interval occurs.

Responsive to providing status to the sender, timer program 118 determines whether another time interval is specified (decision block 418). Timer program 118 analyzes the sender's input to the email provided in action module 122, and determines whether the sender specified multiple time intervals to receive status updates. If timer program 118 determines another time interval is specified ("yes" branch, decision block 418), then the program waits for the specified time and returns to step 414 to determine if the action is complete.

If timer program 118 determines another time interval is not specified ("no" branch, decision block 418), or if timer program 118 determines the sender did not specify a time interval for status ("no" branch, decision block 412), then timer program 118 determines if there is a due date (decision block 419).

If timer program 118 determines there is a due date ("yes" branch, decision block 419), then the program determines if the action is complete by the due date (decision block 420). If there is no specified time interval, then timer program 118 waits until the due date expires and determines if the assigned action is complete. Timer program 118 determines if the action is complete as described above with respect to decision block 414.

If timer program 118 determines the action is not complete by the due date ("no" branch, decision block 420), then the program notifies the recipient (step 422). In one embodiment, if timer program 118 determines that email client 110 is active, then the program can notify the recipient via a popup box in email client 110. In an embodiment where the sender has opted to notify the recipient via an SMS message, timer program 118 sends an SMS message to the recipient to alert the recipient that the action is overdue. For example, timer program 118 may send a text message to the recipient's mobile phone. In an embodiment where the sender has not opted to notify the recipient via an SMS message, timer program 118 can notify the sender that additional action is needed to notify the recipient. For example, timer program 118 can present a popup box to the sender, via action module 122, that states, "The recipient did not complete the action by the due date—notify via SMS?" and provide "yes" and "no" checkboxes from which the sender can choose.

Responsive to notifying the recipient, or if timer program 118 determines the action is complete within a specified time interval ("yes" branch, decision block 414), or if timer program 118 determines there is no due date ("no" branch, decision block 419), or if timer program 118 determines the action is complete by the due date ("yes" branch, decision block 420), then the program provides status to the sender (step 424). As described above with respect to step 416, timer program 118 can provide status of the action to the sender in a plurality of methods.

Figure 5:
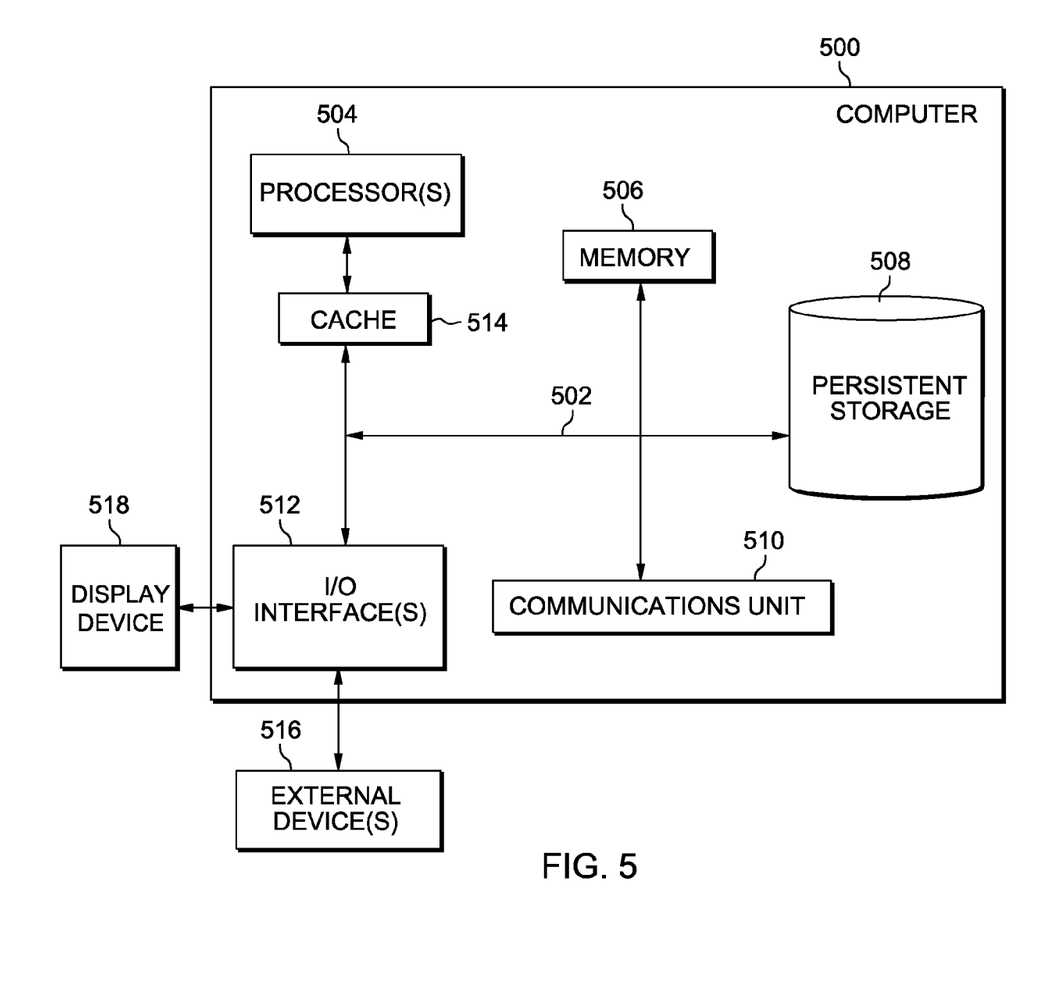
FIG. 5 depicts a block diagram of components of a computer system, which is an example of a system such as the client computing device or the server computer within the distributed data processing environment of FIG. 1, in accordance with an embodiment of the present invention.

FIG. 5 depicts a block diagram of components of computer system 500, which is an example of a system such as sender client computing device 104 or server computer 112 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computer system 500 includes processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of sender client computing device 104, recipient client computing device 108, and server computer 112. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computer system 500. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for action assignment and tracking, the method comprising the steps of:
   receiving, by one or more computer processors, a first email from a first computing device wherein the first email includes at least one action assigned by a sender of the first email to at least one recipient of the first email;
   determining, by the one or more computer processors, whether the sender specified a due date for the at least one action;
   determining, by the one or more computer processors, whether the sender specified one or more time intervals for a status update of the at least one action;
   responsive to determining the sender specified at least one of the due date for the at least one action and the one or more time intervals for a status update of the at least one action, initiating, by the one or more computer processors, a timer;
   responsive to determining the at least one action includes the due date, determining, by the one or more computer processors, whether the at least one recipient is available;
   responsive to determining the at least one recipient is not available, determining, by the one or more computer processors, whether the at least one recipient will be available prior to the due date of the at least one action;
   responsive to determining the at least one recipient is not available prior to the due date of the at least one action, notifying, by the one or more computer processors, via a short messaging service message, the at least one recipient that the first email is sent; and
   responsive to determining the sender specified the one or more time intervals for the status update of the at least one action, providing, by the one or more computer processors, a status of the at least one action to the sender at the one or more time intervals.

2. The method of claim 1, further comprising:
   responsive to receiving the first email from the first computing device, sending, by the one or more computer processors, the first email to a second computing device; and
   notifying, by the one or more computer processors, via a short messaging service message, the at least one recipient that the first email is sent.

3. The method of claim 1, further comprising:
   responsive to determining the at least one action includes the due date, determining, by the one or more computer processors, whether the at least one action is complete by the due date;
   responsive to determining the at least one action is not complete by the due date, notifying, by the one or more computer processors, the at least one recipient; and
   providing, by the one or more computer processors, the status of the at least one action to the sender.

4. The method of claim 3, wherein notifying the recipient includes at least one of:
   sending a notification via a short messaging service message, or displaying an alert on a second computing device.

5. The method of claim 3, further comprising, responsive to determining the at least one action is complete by the due date, providing, by the one or more computer processors, the status of the at least one action to the sender.

6. The method of claim 1, wherein providing the status of the at least one action to the sender includes at least one of: providing a dashboard that displays the status of the at least one action on the first computing device, or displaying a pop-up box on the first computing device.

7. The method of claim 1, wherein the at least one action assigned by a sender includes at least one of: a name of the at least one recipient, the due date, the one or more time intervals for one or more status updates, and a description of the at least one action.

8. The method of claim 1, wherein determining whether the sender specified the due date for the at least one action further comprises, retrieving, by the one or more computer processors, data associated with the first email that indicates the due date.

9. The method of claim 1, wherein determining whether the sender specified the one or more time intervals for the status update of the at least one action further comprises, retrieving, by the one or more computer processors, data associated with the first email that indicates the one or more time intervals for the status update of the at least one action.

10. The method of claim 1, wherein the sender generates the first email utilizing a function capable of assigning the at least one action to the at least one recipient.

11. The method of claim 10, wherein the function is further capable of notifying the at least one recipient via a short messaging service message.

12. A computer program product for action assignment and tracking, the computer program product comprising:
one or more computer readable storage media and program instructions stored on the one or more computer readable storage media, the program instructions comprising:
program instructions to receive a first email from a first computing device wherein the first email includes at least one action assigned by a sender of the first email to at least one recipient of the first email;
program instructions to determine whether the sender specified a due date for the at least one action;
program instructions to determine whether the sender specified one or more time intervals for a status update of the at least one action;
responsive to determining the sender specified at least one of the due date for the at least one action and the one or more time intervals for a status update of the at least one action, program instructions to initiate a timer;
responsive to determining the at least one action includes the due date, program instructions to determine whether the at least one recipient is available;
responsive to determining the at least one recipient is not available, program instructions to determine whether the at least one recipient will be available prior to the due date of the at least one action;
responsive to determining the at least one recipient is not available prior to the due date of the at least one action, program instructions to notify via a short messaging service message, the at least one recipient that the first email is sent; and
responsive to determining the sender specified the one or more time intervals for the status update of the at least one action, program instructions to provide a status of the at least one action to the sender at the one or more time intervals.

13. The computer program product of claim 12, further comprising:
responsive to receiving the first email from the first computing device, program instructions to send the first email to a second computing device; and
program instructions to notify via a short messaging service message, the at least one recipient that the first email is sent.

14. The computer program product of claim 12, further comprising:
responsive to determining the at least one action includes the due date, program instructions to determine whether the at least one action is complete by the due date;
responsive to determining the at least one action is not complete by the due date, program instructions to notify the at least one recipient; and
program instructions to provide the status of the at least one action to the sender.

15. The computer program product of claim 14, wherein notifying the recipient includes at least one of: sending a notification via a short messaging service message, or displaying an alert on a second computing device.

16. The computer program product of claim 14, further comprising, responsive to determining the at least one action is complete by the due date, program instructions to provide the status of the at least one action to the sender.

17. The computer program product of claim 13, wherein providing the status of the at least one action to the sender includes at least one of: providing a dashboard that displays the status of the at least one action on the first computing device, or displaying a pop-up box on the first computing device.

18. A computer system for action assignment and tracking, the computer system comprising:
one or more computer processors;
one or more computer readable storage media;
program instructions stored on the one or more computer readable storage media for execution by at least one of the one or more computer processors, the program instructions comprising:
program instructions to receive a first email from a first computing device wherein the first email includes at least one action assigned by a sender of the first email to at least one recipient of the first email;
program instructions to determine whether the sender specified a due date for the at least one action;
program instructions to determine whether the sender specified one or more time intervals for a status update of the at least one action;
responsive to determining the sender specified at least one of the due date for the at least one action and the one or more time intervals for a status update of the at least one action, program instructions to initiate a timer;
responsive to determining the at least one action includes the due date, program instructions to determine whether the at least one recipient is available;
responsive to determining the at least one recipient is not available, program instructions to determine whether the at least one recipient will be available prior to the due date of the at least one action;
responsive to determining the at least one recipient is not available prior to the due date of the at least one action, program instructions to notify via a short messaging service message, the at least one recipient that the first email is sent; and
responsive to determining the sender specified the one or more time intervals for the status update of the at least one action, program instructions to provide a status of the at least one action to the sender at the one or more time intervals.

* * * * *